E. BUGATTI.
CONNECTING ROD BEARING.
APPLICATION FILED NOV. 22, 1913.

1,117,970.

Patented Nov. 24, 1914.

Witnesses:—

Inventor:—
Ettore Bugatti
by Paul D. Schilling
his attorney

UNITED STATES PATENT OFFICE.

ETTORE BUGATTI, OF MOLSHEIM, GERMANY.

CONNECTING-ROD BEARING.

1,117,970.  Specification of Letters Patent.  Patented Nov. 24, 1914.

Application filed November 22, 1913. Serial No. 802,463.

*To all whom it may concern:*

Be it known that I, ETTORE BUGATTI, a subject of the King of Italy, and residing at Molsheim, Alsace, Germany, have invented certain new and useful Improvements in Connecting-Rod Bearings, of which the following is a specification.

The present invention has reference to improvements in connecting-rod bearings and relates more specifically to an improved antifriction bearing positioned in the head of the connecting-rod; and the invention essentially consists in forming the bushing or brasses of the bearing into a cage and journaling therein a series of rolling elements with which then the crank pin coöperates, whereby the friction within the bearing with its incidental wear and tear is reduced to a minimum.

In order to make the invention more readily understood, I will now describe it with reference to the accompanying drawing, in which—

Figure 1:
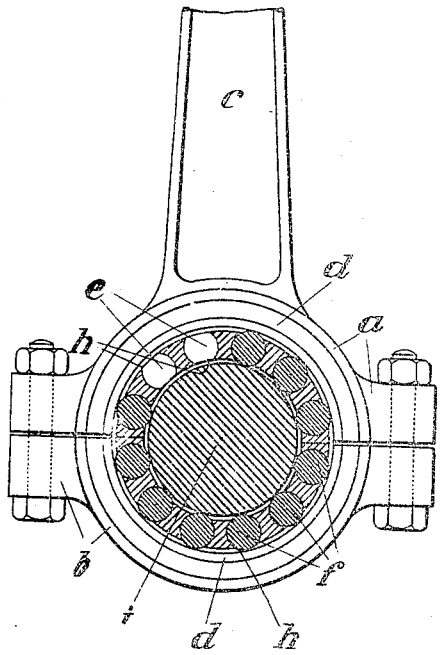
Figure 2:
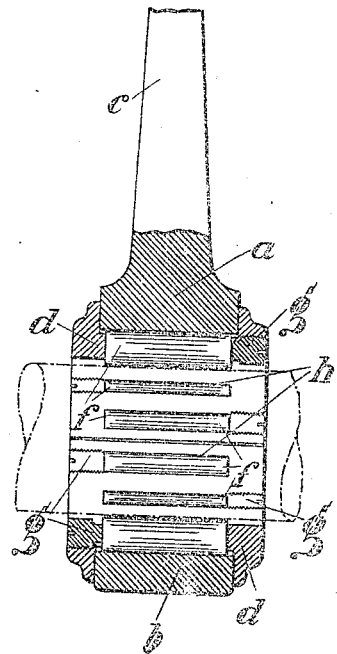

Figure 1 represents the head of a connecting rod, with the annular roller retaining cage, a number of rollers, and the crank pin in section; Fig. 2 shows a vertical section therethrough, with the crank pin in dotted lines.

The two-part head $a$, $b$ of the connecting rod $c$ is provided with a bushing or cage $d$, preferably made in halves, as shown, and into the latter are sunk, preferably from alternate sides, a series of bores $e$, extending partway into the annulus concentrically with, and axially of, the crank pin $i$. Rolling elements $f$ are then introduced into these bores and the latter suitably closed, for instance by means of screw plugs $g$, threading into the outer faces of the bushing near the annular flange parts between which the connecting-rod annulus is confined. The thickness of the bushing annulus is somewhat smaller than the diameter of the bores for the rolling members, so that oppositely disposed slots are presented as at $h$, through which the rollers $f$ extend internally in contact with the central crank pin $i$ and externally with the wall of the connecting-rod annulus $a$, $b$. The crank pin friction in this construction is greatly reduced, and the rollers can readily be replaced in case of need.

What I claim is:—

1. In a roller bearing for connecting rods, in combination with the connecting rod presenting a bearing annulus, a cage in said annulus, lateral flanges on said cage adapted to confine said annulus between them, said cage having bores extending axially thereinto from alternate sides, elongated rolling elements in said bores, and a separate closure for each of said bores.

2. In a roller bearing for connecting rods, in combination with the connecting rod presenting at one end a bearing annulus, a cage in said annulus, flanges on said cage for confining said annulus, said cage being provided with bores axially extending thereinto from alternate sides and of a diameter larger than the thickness of the wall of said cage, whereby for each bore oppositely disposed slots are presented in said cage, rolling elements in said bores, operatively fitting the latter and projecting respectively through the outer and inner slots in said cage, and means for individually removably retaining said rolling elements in said bores, comprising screw closures, one for each separate bore.

In testimony whereof I affix my signature in presence of two witnesses.

ETTORE BUGATTI.

Witnesses:
 FRANK ROHMER,
 J. WILLIAM SCHMIDT.